June 21, 1960

G. C. DEVORE 2,941,336

TREATING GLASS SHEETS

Filed Sept. 20, 1957

INVENTOR.
GUY C. DEVORE
BY
Oscar L. Spencer
ATTORNEY

United States Patent Office 2,941,336
Patented June 21, 1960

2,941,336

TREATING GLASS SHEETS

Guy C. Devore, Cheswick, Pa., assignor to Pittsburgh Plate Glass Company, a corporation of Pennsylvania Filed Sept. 20, 1957, Ser. No. 685,297

3 Claims. (Cl. 49—67)

This application covers improvement in treating glass sheets, and specifically covers an improvement in bending molds for bending elongated glass sheets having pointed extremities to minimize tip curling and tip breakage.

In bending elongated glass sheets having pointed extremities, it has been customary to mount unbent glass sheets on sectionalized, skeletonized bending molds movable into a spread position for receiving unbent glass sheets and into a closed mold position wherein the mold sections provide substantially continuous frames conforming in elevation and outline to the shapes desired for the bent glass sheets.

When glass sheets having pointed extremities are bent on such molds, the pointed extremities soften more rapidly than the remainder of the glass sheet. Hence, the pointed extremities tend to curl away from the shaping surface defined by the mold sections in the closed mold position.

It has been proposed to remedy this situation by attaching to the mold extremities masses of metal of relatively high thermal capacity compared to that of the mold extremities and the extremities of the glass sheets. Such metal masses are called heat abstractors. Thus, when the glass sheets and their supporting molds are heated to glass softening temperature preparatory to bending, the masses of metal attached to the extremities of the mold sections selectively abstract heat and retard the heating of the glass tips in their vicinity.

Such structures (metal masses attached to the mold extremities) accomplish the desired results, provided sufficient time is available for the glass bending mold to cool between successive runs through a bending lehr. If the heat abstractors are not cooled sufficiently between runs, tip curling is not retarded because the metal masses radiate more heat into the glass tips than they absorb from the ambient surroundings. Also, a heat abstractor hotter than the surrounding atmosphere in an annealing lehr disturbs the annealing cycle of the adjacent glass tips and thus is likely to cause tip breakage.

Unfortunately, the insatiable demand of automotive manufacturers for millions of curved automotive glazing units annually requires very rapid production. Thus, it is necessary to build a tremendous number of bending molds for each production item in order to permit each individual mold sufficient time to cool gradually to a temperature suitable for handling an unbent glass sheet for bending, or else it is necessary to accelerate the cooling by dispensing a cooling fluid, such as water, onto the molds after they complete a bending cycle in order to prepare them for a subsequent bending cycle.

The former alternative raises the production costs per bent vehicle glazing unit unduly. The latter alternative results in mold warpage sufficient to cause the units fabricated on such molds to fall out of tolerance.

The present invention provides a structure for glass bending molds that inhibits tip curling and also permits the mold tips to cool sufficiently rapidly between successive bending cycles to avoid the necessity for a large inventory of bending molds for each production item or the employment of techniques tending to warp the molds.

The problem described above has been solved by attaching horse-shoe shaped heat abstractor members of relatively high thermal capacity compared to an extremity portion of the mold at their inboard extremities only to the outside lateral faces of the mold extremities. The horse-shoe shaped heat abstractor members are so constructed and arranged as to provide a space between each pointed mold extremity and its attached heat abstractor member.

Separating the heat abstractors from the pointed mold extremities minimizes thermal conduction between the heat abstractors and the mold, especially at the mold extremities where the extremities of the glass sheets are supported. The proximity of the heat abstractor members adjacent the pointed glass sheet extremities provides sufficient thermal ballast to retard the softening of the pointed glass sheet extremities during the heating phase of the bending cycle. Furthermore, since the heat abstractor members are separated from the pointed mold extremities, a greater proportion of the surface is exposed than in earlier structures wherein they were continuously attached to the mold extremities. Hence, heat abstractors constructed according to the present invention cool more rapidly between heating cycles and operate more efficiently to retard glass tip heating than earlier devices.

The present invention will be better understood after studying a description of a particular embodiment illustrative thereof.

In the drawings which form part of the present invention and wherein like reference numerals refer to similar structural elements.

Figure 1:
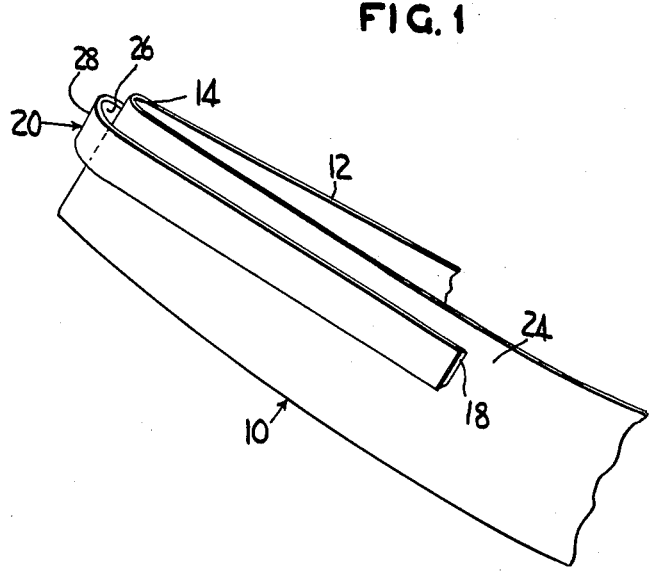
Figure 1 is an elevational view partly in perspective of a longitudinal extremity of a skeletonized bending mold incorporating the teaching of the present invention.
Figure 2:
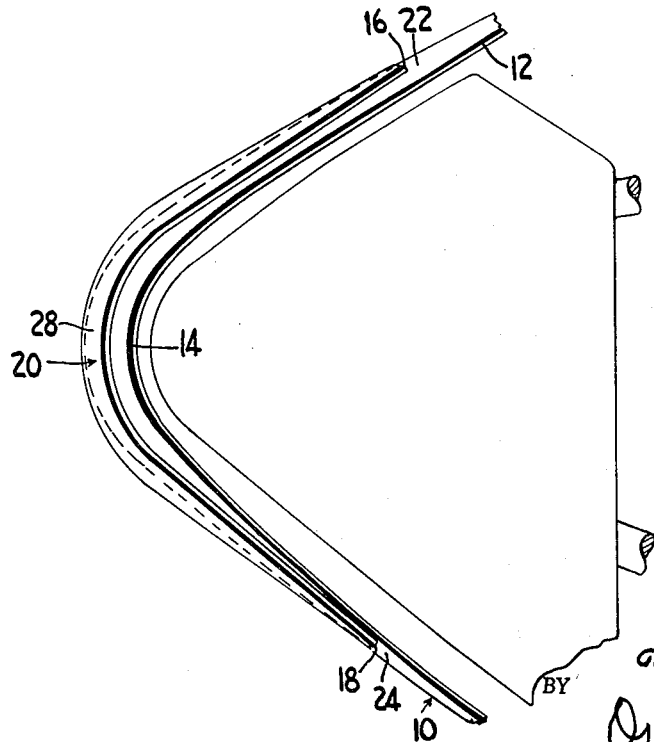
Figure 2 is a plan view of the fragmentary portion of the sectionalized mold seen in Figure 1.

Referring to the drawings, reference number 10 refers to an end section of a sectionalized bending mold. The section 10 comprises an edgewise disposed rail having an upper edge 12 conforming in elevation and outline to the shape desired for an extremity of glass sheets to be bent thereon. The rail is reversely curved to form a pointed extremity 14.

Slightly inboard of the pointed extremity 14, the tips 16 and 18 of a horse-shoe shaped member 20 are attached to the outside lateral faces 22 and 24, respectively, of the mold rail. Member 20 is preferably 1 inch wide and ¼ inch thick and is so constructed and arranged relative to the end section 10 that it embraces the pointed extremities 14 of the skeletonized bending mold. The separation between the horse-shoe shaped member 20 and the lateral faces 22 and 24 increases gradually toward the pointed extremity 14 of the mold section 10. The spacing between the inner surface 26 of the rounded portion 28 of the horse-shoe shaped abstractor member 20 and the pointed extremities 14 of the mold section 10 should preferably be on the order of ¼ inch.

The description of a particular embodiment of the present invention has been for purposes of illustration rather than limitation. Reference to the latter may be had by studying the accompanying claims.

What is claimed is:

1. In a glass sheet bending mold having an upper shaping surface conforming in elevation and outline to the shape desired for a bent glass sheet and including outside lateral faces converging in a pointed extremity, a heat abstractor member, of high thermal capacity compared to that of an extremity portion of the mold, attached at its ends only to the outside lateral faces of said mold inboard of the pointed mold extremity, said heat abstractor member having an inner surface embracing said outside lateral faces in spaced relation thereto.

2. A sectionalized glass sheet bending mold including an end molding section comprising an edgewise disposed mold rail having an upper shaping surface conforming in elevation and outline to the shape desired for an extremity of a bent glass sheet, said mold rail being reversely curved and having outside lateral faces converging in a pointed extremity, a heat abstractor member having an inner surface embracing said outside lateral faces in spaced relation thereto, the distance between said inner surface and each said outside lateral face increasing gradually toward said pointed extremity, and means spaced from said pointed extremity attaching said heat abstractor member to the outer lateral faces of said mold rail at locations spaced from said pointed extremity.

3. An end molding section for a glass sheet bending mold comprising an edgewise disposed mold rail having an upper shaping surface conforming in elevation and outline to the shape desired for an extremity of a bent glass sheet, said mold rail having outer lateral faces converging in a pointed extremity, and a horse-shoe shaped heat abstractor member having an inner surface embracing said pointed extremity in spaced relation thereto, the tips of said horse-shoe shaped heat abstractor member being attached to the outer lateral faces of said edgewise disposed mold rail at locations spaced from said pointed extremity.

References Cited in the file of this patent

UNITED STATES PATENTS

| | | |
|---|---|---|
| 2,348,278 | Boyles et al. | May 9, 1944 |
| 2,348,279 | Boyles et al. | May 9, 1944 |
| 2,452,488 | Paddock et al. | Oct. 26, 1948 |
| 2,691,854 | Rugg | Oct. 19, 1954 |
| 2,720,729 | Rugg | Oct. 18, 1955 |

FOREIGN PATENTS

| | | |
|---|---|---|
| 1,097,088 | France | Feb. 9, 1955 |
| 768,982 | Great Britain | May 5, 1955 |
| 745,992 | Great Britain | Mar. 7, 1956 |